United States Patent
Ombalski et al.

(10) Patent No.: US 9,777,467 B1
(45) Date of Patent: Oct. 3, 2017

(54) SYSTEM FOR IMPROVING FLUID COLLECTION FROM A WELL AND METHOD OF CONSTRUCTION

(71) Applicant: Directed Technologies Drilling, Inc, Bellefonte, PA (US)

(72) Inventors: Daniel W. Ombalski, Julian, PA (US); James M. Doesburg, Gig Harbor, WA (US); James Ditto, Mineral Wells, TX (US); Michael D. Lubrecht, Monroe, WA (US)

(73) Assignee: DIRECTED TECHNOLOGIES DRILLING, INC., Bellefonte, PA (US)

( * ) Notice: Subject to any disclaimer, the term of this patent is extended or adjusted under 35 U.S.C. 154(b) by 359 days.

(21) Appl. No.: 14/298,800

(22) Filed: Jun. 6, 2014

Related U.S. Application Data

(60) Provisional application No. 61/832,143, filed on Jun. 6, 2013.

(51) Int. Cl.
*E21B 7/06* (2006.01)
*E03B 1/00* (2006.01)

(52) U.S. Cl.
CPC ..................................... *E03B 1/00* (2013.01)

(58) Field of Classification Search
USPC .............................................. 166/50; 175/62
See application file for complete search history.

(56) References Cited

U.S. PATENT DOCUMENTS

| | | | |
|---|---|---|---|
| 2,280,851 A | 4/1942 | Ranney | |
| 3,261,401 A * | 7/1966 | Karr | E03B 3/11 166/242.1 |
| 5,771,976 A * | 6/1998 | Talley | E03B 3/14 166/370 |
| 2008/0093123 A1* | 4/2008 | Pinto Bascompte | E03B 3/14 175/45 |

* cited by examiner

*Primary Examiner* — Taras P Bemko
(74) *Attorney, Agent, or Firm* — Lane Powell PC

(57) ABSTRACT

A system for a water supply well that incorporates a vertical well with one or more horizontally drilled collectors extending therefrom. All of the horizontally drilled collectors may be constructed using horizontal directional drilling techniques with the main drilling equipment positioned on the ground surface and thereby defining a surface port for accessing the horizontal collector. The horizontal collector may be cleaned and maintained through the surface port without requiring access through the vertical well.

22 Claims, 4 Drawing Sheets

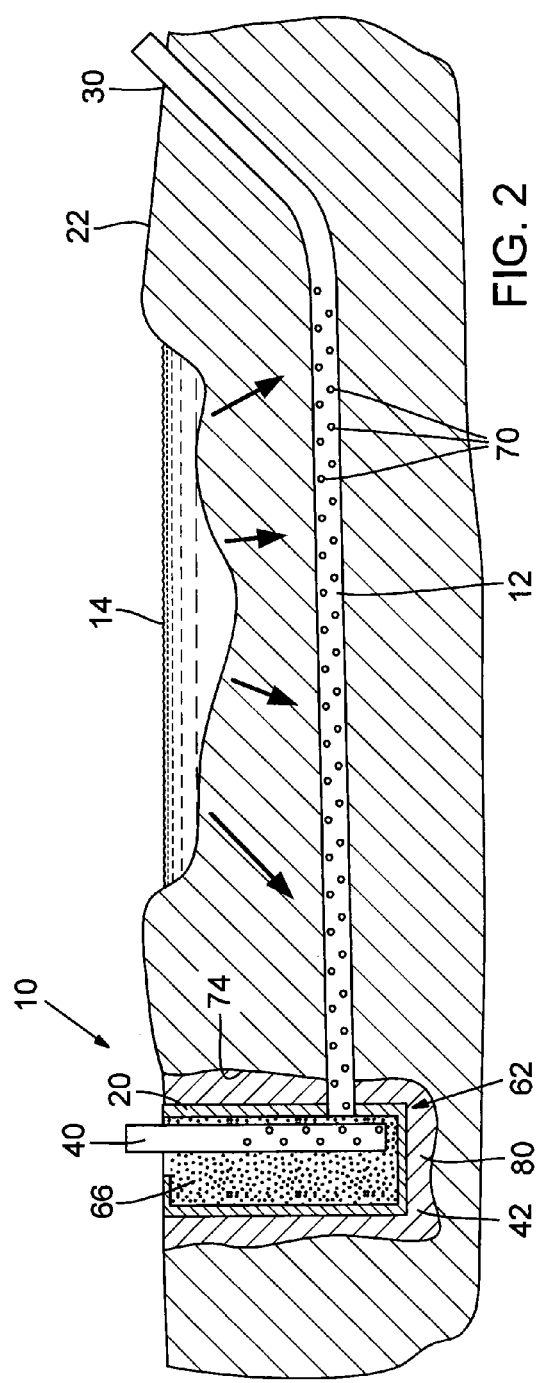

SYSTEM FOR IMPROVING FLUID COLLECTION FROM A WELL AND METHOD OF CONSTRUCTION

CROSS REFERENCE TO RELATED APPLICATION

This application claims priority to U.S. provisional patent application Ser. No. 61/832,143 filed on Jun. 6, 2013, the disclosure of which is hereby incorporated by reference.

TECHNICAL FIELD

The subject matter disclosed herein relates to wells and systems for optimizing their production efficiency.

BACKGROUND

U.S. Pat. No. 2,280,851 to Leo Ranney, the disclosure of which is hereby incorporated by reference, discloses a system for collecting ground water that uses a vertically oriented caisson, combined with one or more well points that extend horizontally out from the bottom of the caisson in a radial pattern. This system is commonly known as a Ranney Collector System, and it has been used in water supply systems for municipalities and other large-volume water consumers. The design is primarily used adjacent to large bodies of surface water to collect water therefrom.

Despite the benefits of Ranney Collector Systems, they have several drawbacks. For example, the system requires a vertical caisson that is large enough in diameter to operate a horizontal drilling system at its base that allows drilling outwards radially through the sides of the caisson. Accordingly, there are limitations on the construction of smaller systems for use where water supply demands are less.

The system requires that a crew perform work at the bottom of a caisson, which is a confined space posing stringent health and safety threats to workers, and the system has limitations on the length of radial collectors that can practically be installed. The maximum horizontal collector length is approximately 250 feet. Also, the radial collectors are unguided and are not steered into position, meaning that they cannot be directed to follow high production zones, and the radial collector points extending from the caisson are not easily accessible for cleaning and maintenance.

SUMMARY

The present subject matter overcomes these issues with the Ranney Collector System. In a disclosed embodiment, the system is a form of liquid supply well that incorporates a vertical caisson with one or more horizontally drilled collectors extending therefrom. The horizontal collectors of the well may be constructed with equipment positioned on the ground surface rather than in the caisson. Radial collectors may be installed using horizontal directional drilling techniques, combined with methods for connecting the radial collectors to the vertical casing. A major innovation of this technique is the ease of maintenance because the ends of the radial collector "arms" are accessible from the surface after construction, thereby facilitating routine cleaning and maintenance of the collector arms.

In disclosed embodiments, improved seals for operably connecting the radial collectors to a vertical well are also disclosed. For example, the seals can be formed by selectively removing sealing material that secured the radial collector to the vertical well to define a chamber in which fluid from the radial collector flows. Alternatively, expandable connectors can operably engage the radial collector at the vertical well.

The foregoing and other objectives, features, and advantages will be more readily understood upon consideration of the following detailed description of the invention taken in conjunction with the accompanying drawings.

BRIEF DESCRIPTION OF THE DRAWINGS

FIG. 2 is a side schematic view of a system for improving collection of fluid from a well in accordance with an alternative embodiment of the subject matter disclosed herein.

FIG. 3 is a side schematic view of a system for improving collection of fluid from a well in accordance with a second alternative embodiment of the subject matter disclosed herein.

DETAILED DESCRIPTION

A system for improving the fluid collection from a well and a method of construction of the system are disclosed in FIGS. 1-5 and described herein.

The present subject matter is a fluid collection system 10 that uses horizontal directional drilling technology combined with improved methods of installation to install a system of substantially horizontal, radial collectors 12 for a fluid supply 14. The fluid is preferably water. Horizontal directional drilling makes use of various methods to locate and steer a drill bit and downhole assembly along a predetermined underground path accurately in three dimensions.

Figure 1:
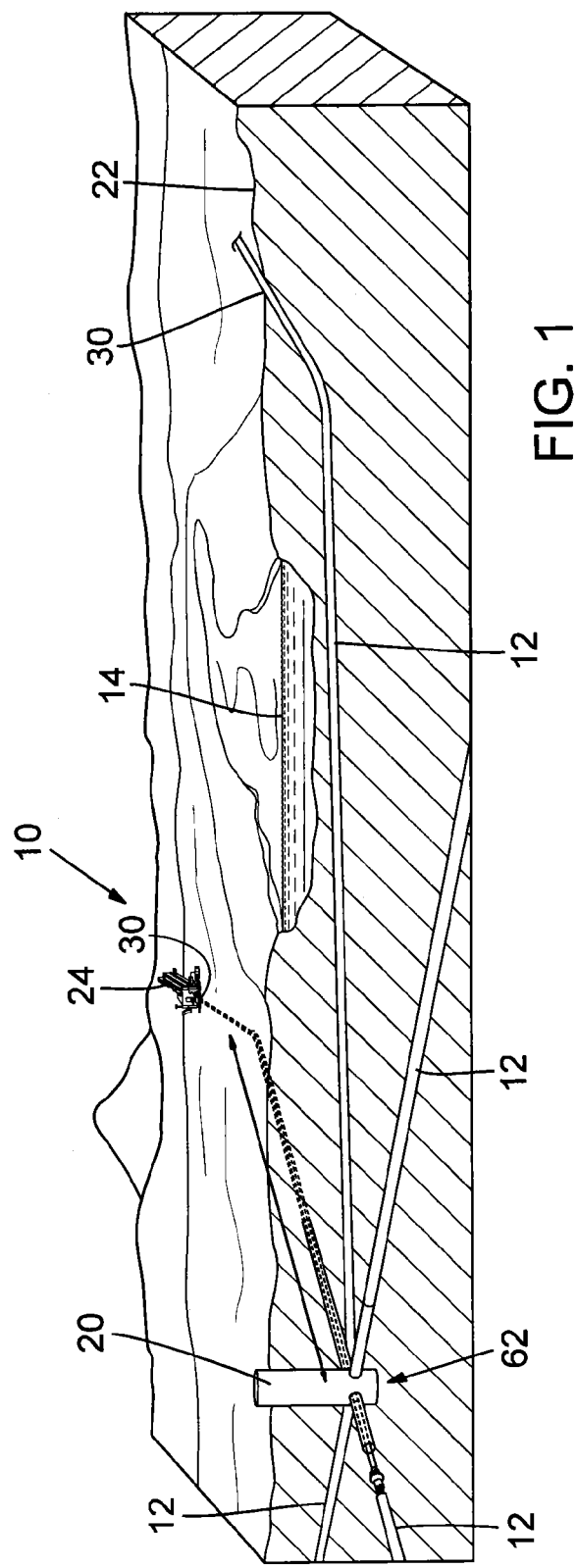
FIG. 1 is an isometric view of a system for improving collection of fluid from a well in accordance with an embodiment of the subject matter disclosed herein.

Referring to FIGS. 1 & 2, a smaller diameter caisson 20 than needed for a Ranney Collector System is advanced below the ground surface 22 to a defined depth. This caisson 20 may be significantly smaller in diameter, and does not need to be watertight since neither tools nor workers need be in the bottom of the well during construction and installation of the substantially horizontal radial collectors 12. As one example, the caisson 20 may be constructed of reinforced concrete rings, with easily breached knock-out locations for receiving the distal ends of the substantially horizontal radial collectors 12 with horizontal drilling tools 24. The caisson 20 may also be a solid pipe or suitable material.

Following placement of the caisson 20, one or more horizontal radial collectors 12 are directionally drilled, preferably from the ground surface 22 using horizontal directional drilling techniques, to intersect the caisson 20 at the specified depth for each collector 12. The bore used to form the collector defines a surface port 30 through which the horizontal collector 12 can be cleaned and maintained without requiring access through the caisson 20. The final step is to place a vertical riser casing 40 in the caisson 20, optionally backfill the caisson 20 with drain rock 42, and then install the pump (not shown) in the vertical riser casing 40.

In addition to the cost savings associated with the horizontal radial collectors 12, there is a significant cost savings in the construction of the caisson 20, since the diameter can be reduced significantly from the typical 13 feet. The diameter can be reduced because no construction activities actually occur inside the caisson 20. The caisson 20 simply provides a wet-well capability to collect fluid from the horizontal radial collectors 12. There is no requirement for a finished floor or watertight walls in the caisson 20.

Referring to FIG. 3, in relatively arid regions of shallow unconfined aquifers with relatively low horizontal transmissivity, one method for water resource development that has proven effective is the installation of horizontal collectors 12 that conduct water to a central location. From this location, the water can be pumped to the surface for consumption without creating a localized cone of depression that quickly exhausts the aquifer in the immediate area of the pump.

A vertical riser casing 40, installed within the wet well 62, to contain a submersible pump (not shown) or the subsurface components of a surface-mounted turbine pump, sufficient to meet the pumping requirements for the well.

Sand and gravel 66 is optionally backfilled within the interior of the wet well 62. Additionally, such sand and gravel 66 may also be provided to support the vertical riser casing 40 and provide a graded sand pack around the vertical riser casing 20.

One or more radial collectors 12, with horizontal perforated sections 70 that penetrate the vertical wet well 62 at the desired depth are provided. These radial collectors 12 may be 1000 feet long, or more and emplaced using surface-based directional drilling methods previously described. Outside the wet well 62, the casing 20 can be slotted to meet design requirements for the in situ material and desired well performance. The radial collectors 12 are installed slightly inclined, preferably 1-2% downward gradient toward the vertical wet well to facilitate gravity drainage of water to the wet well 62.

The section of the radial collector 12 that penetrates into the wet well 62 may be perforated with numerous slots or holes to enhance hydraulic connectivity with the sand/gravel filter within the well, or may be cut and removed after installation to maximize the open area for flow into the wet well 62.

In the case of multiple radial collectors 12, converging on a centrally-located wet well 62, the vertical depth of each radial collector 12 is adjusted where it penetrates the wet well 62 to prevent interference between the casings during installation.

Bentonite/cement grout 74 surrounding the upper portion of the wet well 62 to prevent surface water infiltration is provided.

An exemplar method of construction is disclosed below:

Excavate for the wet well caisson 20, place gravel bedding 80, and set the well caisson 20. Depending on the required depth, this may be with a bucket auger, other large diameter boring method, extended reach excavator, or clamshell type bucket.

Drill one or more radial collectors 12 to the desired depth. The radial collectors intersect the wet well 62 at the base of the entry curve, and continue outward beneath the surface water body or fluid supply 14. A precision intercept is drilled directly though the wet well 62 casing wall and out the other side. Borings could be single or double-ended, either exiting on the far side of the surface water body, or terminating beneath it. The well casing and screen would then be placed.

An alternative drilling method is to drill from the opposite side of the surface water body, to intersect the wet well at depth. In a single-ended installation using this method knock off technology may be used, which enables installation of up to a 4 inch well casing through the drill rods, assures installation even in caving alluvial materials. The bore profile preferably maintains a slight gradient (1-2%) towards the wet well, to facilitate gravity drainage towards it.

After the radial collectors 12 (which are also referred to as "horizontal laterals" herein) are complete, drilling mud is pumped out and the boreholes and wet well are flushed to remove the residual mud.

The vertical casing is placed in the wet well, preferably in a central location that avoids direct contact with all horizontal laterals.

Develop the radial collectors 12 by jetting and pumping from the wet well.

If the radial collectors 12 wells will be cut flush (or nearly so) with the caisson walls, complete this step and cap the well end with a screened cover to exclude sand or gravel.

Backfill the wet well interior with sand and gravel.

Grout the exterior annulus between the excavation and the wet well.

For some applications, the configuration may be simplified. Drilling precision intercepts to vertical wells—piercing the vertical casing at a designated location with a radial collector can be accomplished using conventional horizontal drilling technology. This can be adapted to provide multiple radial collectors directly into a vertical well casing, without the need to construct the wet well. Another potential solution is to simply place the horizontal collector in proximity to the vertical well, without a physical connection, but establishing a close hydrologic connection and preferential pathway between the horizontal collector and vertical well.

Description of a Horizontal Directional Drilled Well with Radial Penetration Grout Seal.

Figure 4:
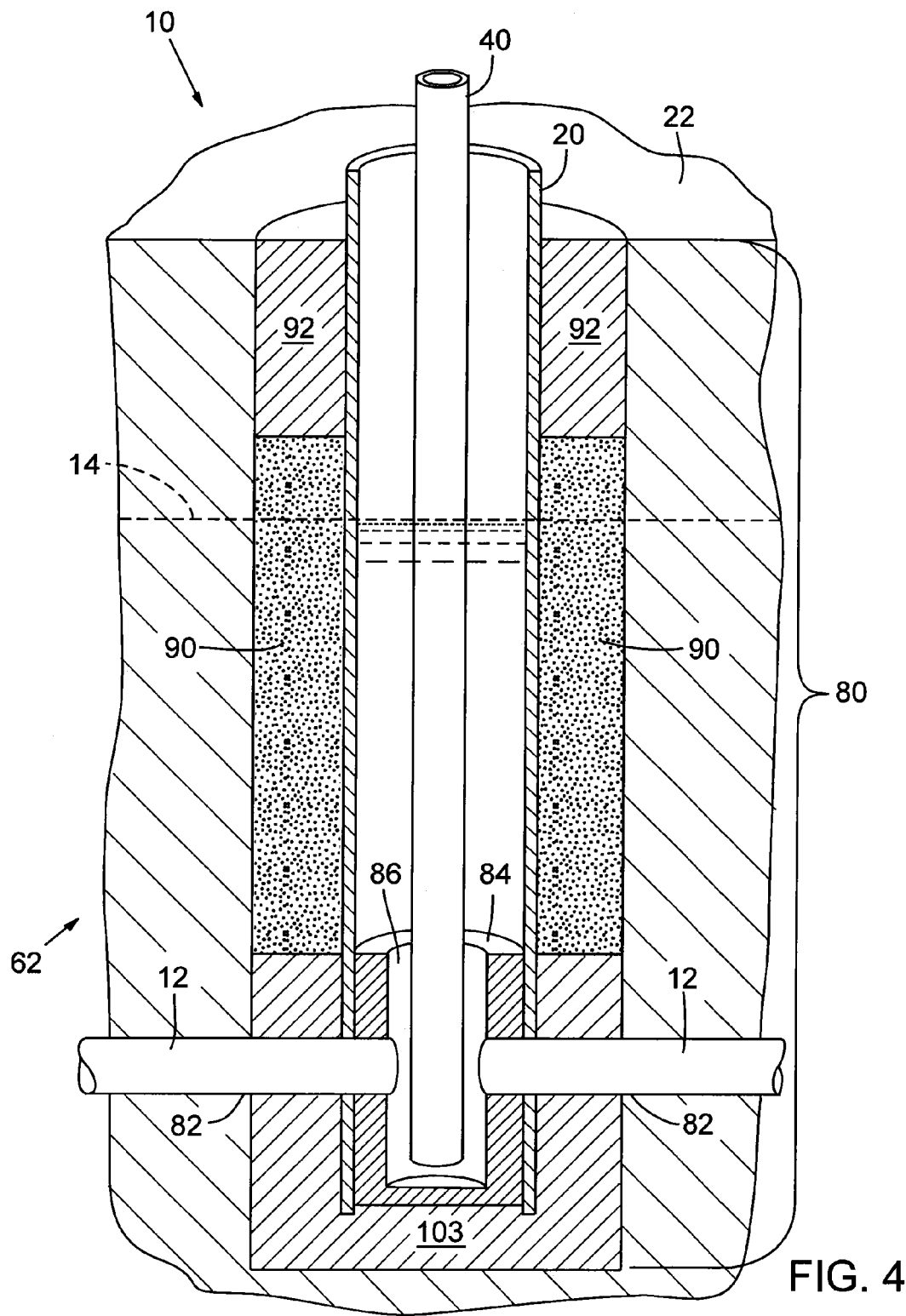
FIG. 4 is a side schematic view of a possible radial collector for use in the system for improving collection of fluid from a well in accordance with the embodiments shown in FIGS. 1-3.

Referring to FIG. 4, an alternative possible embodiment of the horizontal directional drilled ("HDD") radial collector well 10 is disclosed. A vertical bore 80 is excavated using suitable means. A vertical casing or caisson 20 is then lowered into the vertical bore 80. This casing or caisson 20 may have constructed in it weakened circular areas or "knock outs" that are designed to give way easily when impacted by horizontal drilling tools approaching from the exterior of the casing. These knock outs are situated at a known depth and orientation beneath the ground surface.

One or more directional radials are then advanced toward the vertical bore from a selected distance. The directional radial borings are guided to penetrate the vertical bore and casing at the designed location and orientation, encountering the knockouts and pushing them aside.

Perforated or slotted well casing 82 of the desired design is either pushed into the directional boring. This may be done in either a double ended configuration, with solid casing extending through two penetrations and crossing the vertical casing, or in single ended configurations, with the casing end exposed in the vertical casing annulus.

To complete the well, cement grout or concrete 84 is pumped into the bore annulus 86 and inside the vertical casing 20 to a depth that adequately covers the vertical casing penetrations. Once the cement sets, a pump chamber 86 is then drilled into the center of the cemented zone within the vertical casing, exposing the open ends of the radial collector casings. A vertical pump casing (not shown) is then lowered into the pump chamber and secured using any of a number of standard well construction methods. The bore annulus is backfilled with granular material 90, grout 92 and optionally cement bore backfill 103 to meet health agency requirements for potable water wells.

Description of HDD Well with Expansive Seal

Figure 5:
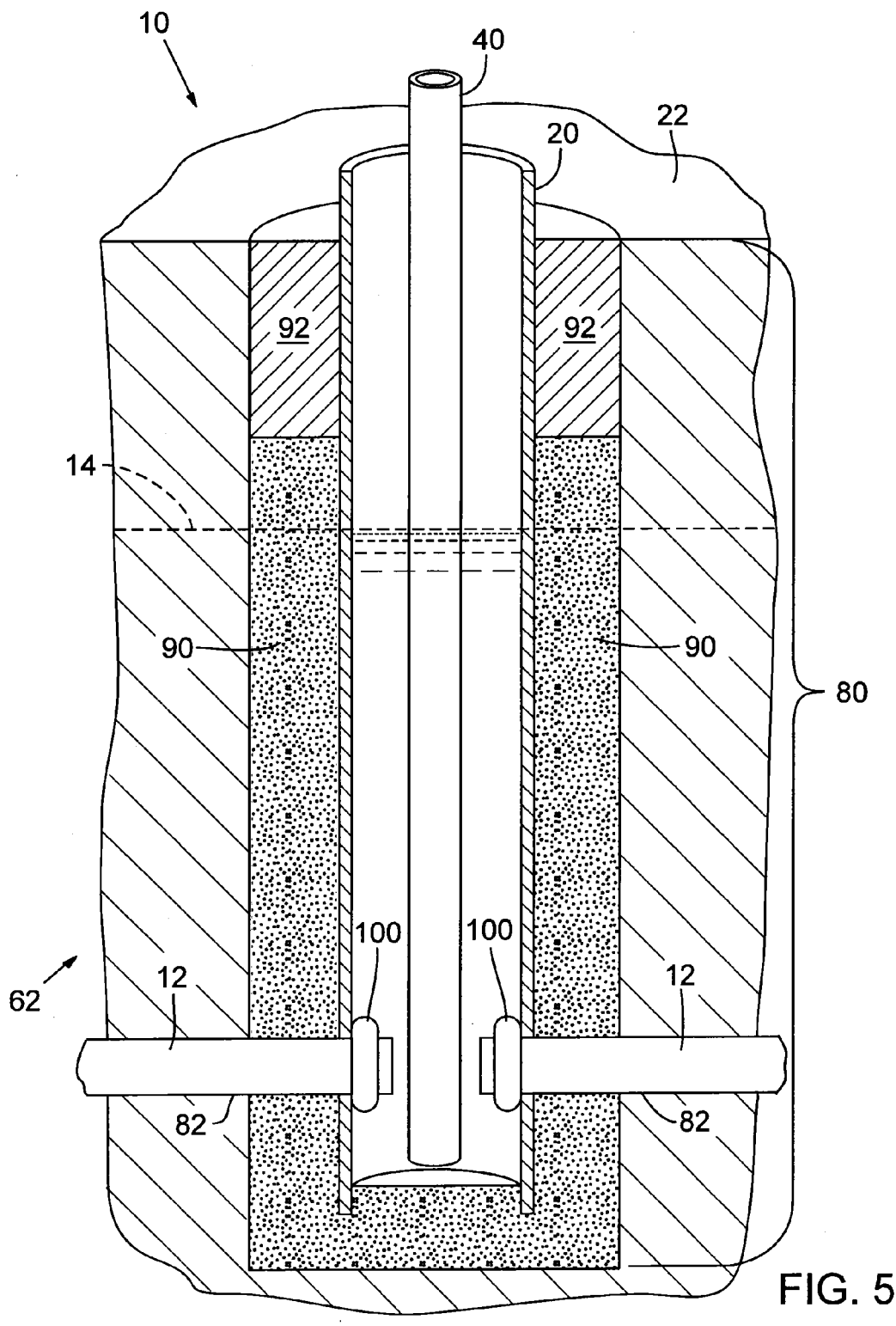
FIG. 5 is a side schematic view of an alternative possible radial collector for use in the system for improving collection of a fluid from a well in accordance with the embodiments shown in FIGS. 1-3.

Referring to FIG. 5, another embodiment of the HDD radial collector well 10 is disclosed. A vertical bore 80 is excavated using suitable means. A vertical casing or caisson 20 is lowered into the vertical bore 80. This casing or caisson 20 may have constructed in it weakened circular areas or "knock outs" that are designed to give way easily when impacted by horizontal drilling tools approaching from the exterior of the casing. These knock outs are situated at a known depth and orientation beneath the ground surface.

One or more directional radials are then advanced toward the vertical bore from a selected distance. The directional radial borings are guided to penetrate the vertical bore and casing at the designed location and orientation, encountering the knockouts and pushing them aside.

Perforated or slotted well casing 82 of the desired design is either pushed into the directional boring. This may be done in either a double ended configuration, with solid casing extending through two penetrations and crossing the vertical casing, or in single ended configurations, with the casing end exposed in the vertical casing annulus.

To complete the well, the radial well casing 96 is sealed to the caisson 20. There are several options that may be completed in this embodiment of the well completion. In one option, the casing is pulled through an expandable rubber or plastic torus 100 that encircles the outer circumference of the casing. This seal is pushed up tight against the vertical casing wall. The seal may be located on either the interior or exterior wall of the vertical casing, depending on the preferred construction method, borehole stability, or other factors. Once in place, the expandable seal 100 is inflated with air, grout, expansive catalyzed foam, or other material to form a tight seal between the vertical riser casing 40 and the caisson 20.

Once the seals are in place, a vertical pump casing (not shown) is then lowered into the pump chamber and secured using any of a number of standard well construction methods. The bore annulus is backfilled with granular material 90 and grout 92 to meet health agency requirements for potable water wells. A pump and discharge line (not shown) are then installed in the pump casing (not shown).

The terms and expressions which have been employed in the foregoing specification are used therein as terms of description and not of limitation, and there is no intention in the use of such terms and expressions of excluding equivalents of the features shown and described or portions thereof, it being recognized that the scope of the subject matter is defined and limited only by the claims which follow.

What is claimed is:

1. A method of constructing a fluid collection system comprising:
   extending a vertical well below a ground surface by a defined depth;
   using horizontal drilling techniques to cut a bore and install at least one substantially horizontal collector into the vertical well, the bore originating from the ground surface to define a surface port for accessing the horizontal collector; and
   operably securing a pump to the vertical well;
   wherein the step of using horizontal drilling techniques to bore and install at least one substantially horizontal collector into the vertical well includes the substantially horizontal collector intersecting the vertical well at a defined connection point, and further including the step of forming a seal at the connection point; and
   wherein the step of forming a seal at the connection point includes
   filling the well at the connection point with sealing material to cover the connection point;
   removing a portion of the sealing material to define a chamber; and
   clearing the horizontal collector of sealing material; and
   providing a fluid flow pathway through the horizontal collector into the chamber.

2. The method of constructing a fluid collection system of claim 1, further including cleaning the horizontal collector through the surface port.

3. The method of constructing a fluid collection system of claim 1, wherein the using the horizontal drilling technique step includes extending the substantially horizontal collector towards the vertical well in a slightly downward angle and configuring the horizontal collectors to drain water downward through the collector into the vertical well.

4. The method of constructing a fluid collection system of claim 1, further including providing recesses in the horizontal collector for filtering and receiving water therethrough.

5. The method of constructing a fluid collection system of claim 1, further including extending a vertical sump pump casing into the vertical well.

6. The method of constructing a fluid collection system of claim 1, wherein the fluid is water.

7. A method of constructing a fluid collection system comprising:
   extending a vertical well below a ground surface by a defined depth;
   using horizontal drilling techniques to cut a bore and install at least one substantially horizontal collector into the vertical well, the bore originating from the ground surface to define a surface port for accessing the horizontal collector; and
   operably securing a pump to the vertical well;
   wherein the step of using horizontal drilling techniques to bore and install at least one substantially horizontal collector into the vertical well includes the substantially horizontal collector intersecting the vertical well at a defined connection point, and further including the step of forming a seal at the connection point; and
   wherein the step of forming a seal at the connection point includes the steps of:
   providing an expandable seal at the connection point and extending an end of the substantially horizontal collector therethrough; and
   expanding the seal at the connection point to thereby seal the substantially horizontal collector to the vertical well.

8. The method of constructing a fluid collection system of claim 7, wherein the expandable seal is actuated by the group consisting of pneumatic, hydraulic, material introduction and mechanical structures.

9. The method of constructing a fluid collection system of claim 7, wherein the fluid collected is water.

10. The method of constructing a fluid collection system of claim 7, wherein the using the horizontal drilling technique step includes extending the substantially horizontal collector towards the vertical well in a slightly downward angle and configuring the horizontal collectors to drain water downward through the collector into the vertical well.

11. The method of constructing a fluid collection system of claim 7, further including providing recesses in the horizontal collector for filtering and receiving water therethrough.

12. The method of constructing a fluid collection system of claim 7, further including extending a vertical sump pump casing into the vertical well.

13. The method of constructing a fluid collection system of claim 7, wherein the fluid is water.

14. A well for collecting fluid comprising;
a substantially vertical well extending below a surface;
a substantially horizontal collector having a first end and an opposite second end, the collector extending from the vertical well at the first end and having a portion extending radially outward from the vertical well below the surface, the opposite second end extending upward towards and piercing the surface and defining a servicing access port;
the well further including a seal operably connecting the first end of the collector to the vertical well wherein the seal is formed by encasing the first end of the collector with sealing material within the vertical well and then selectively removing portions of the sealing material to define a chamber in which fluid flows from the collector to the chamber.

15. The well for collecting fluid below a surface of claim 14, wherein the seal is an expandable seal.

16. The well for collecting fluid below a surface of claim 15, wherein the expandable seal is actuated by the group consisting of pneumatic, hydraulic, material introduction and mechanical structures.

17. The well for collecting fluid below a surface of claim 14, wherein the fluid collected is ground water.

18. The well for collecting fluid below a surface of claim 14, further comprising: a second substantially horizontal collector operably secured to the vertical well.

19. The well for collecting fluid below a surface of claim 14, wherein the portion extending radially outward is substantially horizontal.

20. The well for collecting fluid below a surface of claim 14, wherein the portion extending radially outward has less than or equal to a 2 degree pitch directed toward the vertical well and is structured to facilitate flow of liquid from the collector to the vertical well.

21. The well for collecting fluid below a surface of claim 14, further including a pump operably secured to the vertical well for pumping collected liquid therefrom.

22. The well for collecting fluid below a surface of claim 14, further including a seal operably connecting the first end of the collector to the vertical well.

* * * * *